(12) United States Patent
Wang et al.

(10) Patent No.: US 11,372,244 B2
(45) Date of Patent: Jun. 28, 2022

(54) LASER BEAM SCANNING DISPLAY DEVICE AND AUGMENTED REALITY GLASSES

(71) Applicant: GOERTEK TECHNOLOGY CO., LTD., Qingdao (CN)

(72) Inventors: Jin Wang, Qingdao (CN); Bin Jiang, Qingdao (CN)

(73) Assignee: GOERTEK TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 16/073,692

(22) PCT Filed: Dec. 25, 2017

(86) PCT No.: PCT/CN2017/118328
§ 371 (c)(1),
(2) Date: Jul. 27, 2018

(87) PCT Pub. No.: WO2019/126951
PCT Pub. Date: Jul. 4, 2019

(65) Prior Publication Data
US 2019/0285893 A1    Sep. 19, 2019

(51) Int. Cl.
*G02B 27/01*        (2006.01)
*G02B 7/04*         (2021.01)
(Continued)

(52) U.S. Cl.
CPC ........... *G02B 27/0172* (2013.01); *G02B 7/04* (2013.01); *G02B 26/10* (2013.01); *G02B 27/01* (2013.01);
(Continued)

(58) Field of Classification Search
CPC ..... G02B 27/0172; G02B 27/01; G02B 27/10
See application file for complete search history.

(56) References Cited

U.S. PATENT DOCUMENTS 4,774,506 A * 9/1988 Bossoutrout ........... G09G 5/393
                                                345/473
5,400,079 A * 3/1995 Martinez ................. G09G 3/20
                                                348/739
(Continued)

FOREIGN PATENT DOCUMENTS

CN        201378859 Y     1/2010
CN        101202925 A     9/2012
(Continued)

OTHER PUBLICATIONS

KR Office Action in Application No. 10-2018-7022046 dated Oct. 7, 2019.
(Continued)

*Primary Examiner* — Amy Onyekaba
(74) *Attorney, Agent, or Firm* — Maschoff Brennan

(57) ABSTRACT

The present disclosure provide a laser beam scanning display device and augmented reality (AR) glasses, comprising a focusing lens, a laser emitter located at a focal point of the focusing lens, a beam combiner, a micro-electromechanical assembly and a projection lens. The laser emitter emits trichromatic laser signals, which are irradiated into the beam combiner via the focusing lens. The beam combiner converges the trichromatic laser signals into a convergent laser signal and emits it to the micro-electromechanical assembly. The micro-electromechanical assembly scans the received convergent laser signal to generate a content to be displayed. In the above laser beam scanning display device, the content to be displayed, which is generated by the micro-electromechanical assembly, is displayed on the screen via the projection lens, which dispenses with any laser signal reflecting or transmitting means, thus reducing the volume of the device.

20 Claims, 2 Drawing Sheets

(51) Int. Cl.
*G02B 26/10* (2006.01)
*G02B 27/09* (2006.01)
*G06T 19/00* (2011.01)
*G02B 27/10* (2006.01)

(52) U.S. Cl.
CPC ......... *G02B 27/0955* (2013.01); *G02B 27/10* (2013.01); *G06T 19/006* (2013.01)

(56) References Cited

U.S. PATENT DOCUMENTS

| | | | | |
|---|---|---|---|---|
| 5,614,961 | A * | 3/1997 | Gibeau | H04N 9/3129 348/E9.026 |
| 5,719,620 | A * | 2/1998 | Allio | H04N 13/324 348/E13.058 |
| 6,674,415 | B2 | 1/2004 | Nakamura et al. | |
| 8,705,177 | B1 * | 4/2014 | Miao | H04N 13/395 359/13 |
| 9,674,494 | B2 * | 6/2017 | Terasaki | G03B 33/12 |
| 9,766,449 | B2 * | 9/2017 | Bailey | G02B 27/0176 |
| 9,791,926 | B2 * | 10/2017 | Simmons | H04N 13/398 |
| 9,904,051 | B2 * | 2/2018 | Aleem | G06F 3/013 |
| 10,365,548 | B2 * | 7/2019 | Holland | H01S 5/0071 |
| 10,408,999 | B2 * | 9/2019 | Katsuyama | G02B 6/122 |
| 2001/0024326 | A1 | 9/2001 | Nakamura | H04N 9/3185 348/E9.027 |
| 2002/0030636 | A1 * | 3/2002 | Richards | G02B 27/0172 362/135 |
| 2002/0036750 | A1 * | 3/2002 | Eberl | G02B 27/0093 351/207 |
| 2002/0120916 | A1 * | 8/2002 | Snider, Jr. | B32B 17/10669 717/100 |
| 2004/0160960 | A1 * | 8/2004 | Monta | H04N 19/40 375/E7.023 |
| 2006/0033879 | A1 * | 2/2006 | Covannon | H01S 5/36 351/221 |
| 2006/0131492 | A1 * | 6/2006 | Kobayashi | G02B 27/017 250/234 |
| 2007/0188837 | A1 * | 8/2007 | Shimizu | G02B 27/0172 359/13 |
| 2008/0075162 | A1 * | 3/2008 | Lin | H04N 19/44 375/E7.095 |
| 2010/0149073 | A1 * | 6/2010 | Chaum | G02B 27/0075 345/8 |
| 2010/0254617 | A1 * | 10/2010 | Hwang | G06T 3/602 382/296 |
| 2011/0285967 | A1 * | 11/2011 | Gollier | H04N 9/3129 353/38 |
| 2012/0002256 | A1 * | 1/2012 | Lacoste | G03H 1/22 359/489.08 |
| 2012/0099170 | A1 * | 4/2012 | Shikii | H04N 9/3161 359/13 |
| 2012/0169752 | A1 * | 7/2012 | Kurozuka | G02B 26/101 345/545 |
| 2012/0212484 | A1 * | 8/2012 | Haddick | G06Q 30/02 345/419 |
| 2012/0218481 | A1 * | 8/2012 | Popovich | G02B 5/1819 349/11 |
| 2012/0224062 | A1 * | 9/2012 | Lacoste | G09G 5/14 348/148 |
| 2013/0021491 | A1 * | 1/2013 | Lee | G06T 5/50 348/222.1 |
| 2013/0242056 | A1 * | 9/2013 | Fleck | G02B 27/0172 250/206 |
| 2014/0185282 | A1 * | 7/2014 | Hsu | B32B 17/10623 977/773 |
| 2014/0204465 | A1 * | 7/2014 | Yamaguchi | G02B 27/0101 359/633 |
| 2015/0022898 | A1 * | 1/2015 | Yamakawa | G01J 1/4257 356/230 |
| 2015/0036105 | A1 * | 2/2015 | Ide | H04N 9/3132 353/31 |
| 2015/0036221 | A1 * | 2/2015 | Stephenson | G02B 26/10 359/630 |
| 2015/0205134 | A1 * | 7/2015 | Bailey | G02B 26/0816 359/291 |
| 2015/0236472 | A1 * | 8/2015 | Ide | H05K 1/0268 438/15 |
| 2015/0279114 | A1 * | 10/2015 | Yonekubo | G02B 6/0031 345/633 |
| 2015/0362734 | A1 * | 12/2015 | Moser | G03H 1/0465 359/13 |
| 2016/0033771 | A1 * | 2/2016 | Tremblay | G02B 26/10 359/851 |
| 2016/0085084 | A1 * | 3/2016 | Masson | G02B 26/0833 353/30 |
| 2016/0216515 | A1 * | 7/2016 | Bouchier | G02B 27/0172 |
| 2016/0238845 | A1 * | 8/2016 | Alexander | G03H 1/2645 |
| 2016/0327796 | A1 * | 11/2016 | Bailey | G03H 1/2645 |
| 2017/0010473 | A1 * | 1/2017 | Ide | G02B 3/0056 |
| 2017/0013239 | A1 * | 1/2017 | Tabata | G02B 27/01 |
| 2017/0068091 | A1 * | 3/2017 | Greenberg | G06F 3/013 |
| 2017/0118452 | A1 * | 4/2017 | Ogi | H04N 9/3155 |
| 2017/0154558 | A1 * | 6/2017 | Atsuumi | G02B 27/0031 |
| 2017/0219829 | A1 * | 8/2017 | Bailey | G02B 27/0172 |
| 2017/0285343 | A1 * | 10/2017 | Belenkii | H04N 13/344 |
| 2017/0293147 | A1 | 10/2017 | Tremblay et al. | |
| 2017/0299956 | A1 * | 10/2017 | Holland | G02B 27/14 |
| 2017/0315360 | A1 * | 11/2017 | Takeda | G02B 27/0081 |
| 2018/0013994 | A1 * | 1/2018 | Ogi | H04N 9/3161 |
| 2018/0035087 | A1 * | 2/2018 | Xu | G02B 27/0172 |
| 2018/0083422 | A1 * | 3/2018 | Castiglia | H04N 9/3164 |
| 2018/0084232 | A1 * | 3/2018 | Belenkii | H04N 13/324 |
| 2018/0107103 | A1 * | 4/2018 | Holland | G03B 21/2033 |
| 2018/0131911 | A1 * | 5/2018 | Mizuno | G02B 27/0101 |
| 2018/0143427 | A1 * | 5/2018 | Griffin | G02B 17/086 |
| 2018/0164579 | A1 * | 6/2018 | Haran | G01R 19/04 |
| 2018/0181196 | A1 * | 6/2018 | Lee | H04N 5/225251 |
| 2018/0232955 | A1 * | 8/2018 | Namgoong | H04N 13/344 |
| 2018/0352164 | A1 * | 12/2018 | Higuchi | G02B 26/10 |
| 2019/0004325 | A1 * | 1/2019 | Connor | G02B 27/0172 |
| 2019/0129294 | A1 * | 5/2019 | Kimura | G03B 21/2066 |
| 2021/0165213 | A1 * | 6/2021 | Balachandreswaran | G02B 27/0093 |

FOREIGN PATENT DOCUMENTS

| | | |
|---|---|---|
| CN | 204832686 U | 12/2015 |
| CN | 206532036 U | 9/2017 |
| CN | 107861248 A | 3/2018 |
| CN | 207663150 U | 7/2018 |
| JP | 11-044862 A | 2/1992 |
| JP | 2002-55667 A | 2/2002 |
| JP | 2005-181477 A | 7/2005 |
| JP | 2006-178033 A | 7/2006 |
| JP | 2010286589 A | 12/2010 |
| JP | 5273952 B2 | 8/2013 |
| JP | 2016-092508 A | 5/2015 |
| JP | 2017-078756 A | 4/2017 |
| JP | 2017112481 A | 6/2017 |
| WO | 2013/001590 A1 | 1/2013 |
| WO | 2017/180906 A2 | 10/2017 |

OTHER PUBLICATIONS

JP Office Action in Application No. 2018-540105 dated Feb. 4, 2020.
KR Office Action in Application No. 10-2018-7022046 dated Mar. 6, 2020.
KR Office Action in Application No. 10-2018-7022046 dated May 6, 2020.
JP Office Action in Application No. 2018-540105 dated Jul. 8, 2020.
KR Office Action in Application No. 10-2018-7022046 dated Nov. 26, 2020.
JP Office Action in Application No. 2018-540105 dated Jan. 19, 2021.
JP Office Action dated Aug. 17, 2021 as received in application No. JP2018540105A.

(56) References Cited

OTHER PUBLICATIONS

Anonymous, Laser Projector—Wikipedia, Nov. 21, 2017, retrieved from URL: https://en.wikipedia.org/w/index.php?title=Laser_projector&oldid=811389139 [retrieved on Feb. 25, 2021].
Extended European Search Report issued in corresponding application No. 17893501.1, dated Mar. 29, 2021.

* cited by examiner

LASER BEAM SCANNING DISPLAY DEVICE AND AUGMENTED REALITY GLASSES

TECHNICAL FIELD

The present disclosure relates to image display, and more particularly, to a laser beam scanning display device and augmented reality glasses.

BACKGROUND

Augmented reality (referred as "AR" hereafter) technology is one that can generate virtual images by means of computer vision technology and display them in the real world. With this kind of technology, virtual images are overlapped over real-world objects in a real word so that the virtual images and the real-world objects are showed to users, thus providing a new viewing form for users.

In the related art, a display assembly applied to AR apparatus in the AR technology is typically composed of a light source, a light transmitting device and a light reflecting means. Moreover, both the light transmitting means and the light reflecting means are composed of a plurality of optical lenses, so that the display assembly is bigger. In practical applications, AR apparatus is generally a pair of AR glasses or an AR helmet. Therefore, if a bulky display assembly is provided on the AR apparatus, it would be inconvenient for a user to wear the AR apparatus.

SUMMARY

In view of this, some embodiments of the present disclosure provide a laser beam scanning display device and augmented reality (AR) glasses to reduce the volume of the display device and enable it to be better applied to the AR apparatus.

An embodiment of the present disclosure provides a laser beam scanning display device, comprising:

a focusing lens, a laser emitter located at a focal point of the focusing lens, a beam combiner, a micro-electromechanical assembly and a projection lens;

the laser emitter is configured to emit trichromatic laser signals;

the beam combiner is configured to reflect to the micro-electromechanical assembly a convergent laser signal obtained by converging the trichromatic laser signals using the focusing lens;

the micro-electromechanical assembly is configured to scan the received convergent laser signal to generate a content to be displayed, and the projection lens is configured to display the content to be displayed on lenses of AR glasses.

Alternatively, the device further comprises:

a safety monitoring assembly connected with the laser emitter and configured to control an operating state of the laser emitter based on a signal power of each laser signal of the obtained trichromatic laser signals.

Alternatively, the safety monitoring assembly is further configured to:

control the laser emitter to emit the trichromatic laser signals if the signal power of each laser signal of the trichromatic laser signals is less than or equal to a preset safety power; and control the laser emitter to stop emitting the trichromatic laser signals if the signal power of any laser signal of the trichromatic laser signals is greater than the preset safety power.

Alternatively, the device further comprises:

a first driver connected with the laser emitter and configured to drive the laser emitter to determine a number of times of glowing within a preset time period based on color values of various pixel points in the content to be displayed in the three color channels corresponding respectively to three primary colors;

a second driver connected with the micro-electromechanical assembly and configured to drive the micro-electromechanical assembly based on the received convergent laser signal.

Alternatively, the device further comprises:

a controller connected respectively with the first driver and the second driver and configured to generate a first driving signal and a second driving signal to respectively drive the first driver and the second driver.

Alternatively, the content to be displayed is of a video type, and the device further comprises:

a transcoder connected with the controller and configured to transcode an original video content to generate a transcoded video content corresponding to the content to be displayed.

Alternatively, the device further comprises:

a first memory connected with the transcoder and configured to store the transcoded video content;

a second memory connected with the transcoder and configured to store the original video content.

Alternatively, the controller is further configured to send an angle adjustment instruction to the micro-electromechanical assembly, wherein the micro-electromechanical assembly is configured to adjust an angle of a reflecting mirror arranged therein based on a preset adjustment angle contained in the angle adjustment instruction, so that the micro-electromechanical assembly scans the convergent signal according to a preset shape and in a preset scanning manner.

Alternatively, the controller is further configured to:

calculate an error angle between an actual adjustment angle of the reflecting mirror and the preset adjustment angle;

calibrate an adjustment angle of the reflecting mirror based on the preset adjustment angle and the error angle.

An embodiment of the present disclosure provides AR glasses comprising lenses, a glasses holder for fixing the lenses and any one of the laser beam scanning display devices involved in the above description, wherein the laser beam scanning display device is arranged on an outer side of the glasses holder;

the lenses constitute the screen.

An embodiment of the present disclosure provides a laser beam scanning display device and AR glasses, wherein the laser beam scanning display device comprises a focusing lens, a laser emitter located at a focal point of the focusing lens, a beam combiner, a micro-electromechanical assembly and a projection lens. After the laser emitter in the laser beam scanning display device emits trichromatic laser signals, these trichromatic laser signals are irradiated into the beam combiner via the focusing lens; then, the beam combiner may converge the three trichromatic laser signals of red, green and blue into a convergent laser signal and reflect it to the micro-electromechanical assembly. The micro-electromechanical assembly scans the received convergent laser signal to generate a content to be displayed. The content to be displayed, which is generated after scanning, is displayed via the projection lens on the lenses of the AR glasses. Therefore, in the above laser beam scanning display device, after the convergent signal is generated, the content to be displayed, which is generated by the micro-electromechanical assembly, can be directly displayed, by the projection lens, on the lenses of the AR glasses, and no laser signal reflecting or transmitting means is required to be arranged between the micro-electromechanical assembly and the projection lens. The means for reflecting or transmitting laser signals is generally composed of a plurality of reflecting or transmitting lenses, which is complex in structure and large in size. Therefore, the laser beam scanning display device provided by the present disclosure omits such bulky laser signal reflecting or transmitting means. In other words, the volume of the laser beam scanning display device is greatly reduced, such that the laser beam scanning display device can be better applied to AR apparatus.

DESCRIPTION OF THE EMBODIMENTS

To make the object, technical solutions and advantages of the present disclosure more clear, the technical solutions as set forth in some embodiments of the present disclosure will be described below in combination with the accompanying drawings in the related embodiments of the present disclosure, and it is obvious that the described embodiments only constitute some of the embodiments of the present disclosure, instead of all of the embodiments thereof. Based on the embodiments in the present disclosure, all the other embodiments obtained by those of ordinary skill in the art without inventive efforts shall be covered by the scope of protection of the present disclosure.

The terms used in some embodiments of the present disclosure are merely for the purposes of describing particular embodiments, and not intended to limit the present disclosure. Singular forms "One", "Said" and "The" as used in some embodiments and the appended claims of the present disclosure are intended to comprise plural forms as well, unless the context indicates otherwise. The plural form "A plurality of" generally comprises at least two aspects, but is not precluded from comprising at least one aspect.

It should be appreciated that the term "And/or" as used herein is merely an associated relationship for describing associated objects, which indicates that there may be three relationships. For example, in the case of A and/or B, it may indicate that there are three situations: A exists alone; A and B exist simultaneously; and B exists alone. In addition, the character "/" as used herein generally indicates that there is an "or" relationship between the associated objects present before and after.

It should be appreciated that although XXX may be described in some embodiments of the present disclosure using the terms "The first", "The second", "The third" and the like, these XXX should not be limited to these terms. These terms are merely used to distinguish between these XXX. For example, without departing from the scope of some embodiments of the present disclosure, a first XXX may also be called a second XXX. Similarly, the second XXX may also be called the first XXX.

It should also be noted that the terms "Comprising", "Including" or any other variants thereof are intended to cover non-exclusive inclusion, such that the article or system comprising a series of elements comprises not only those elements, but also other elements that are not expressly listed or elements intrinsic to this kind of article or system. Without more constraints, an element defined by the statement "Comprising a . . . " does not preclude the existence of additional identical elements in the article or system that comprises the element.

Figure 1:
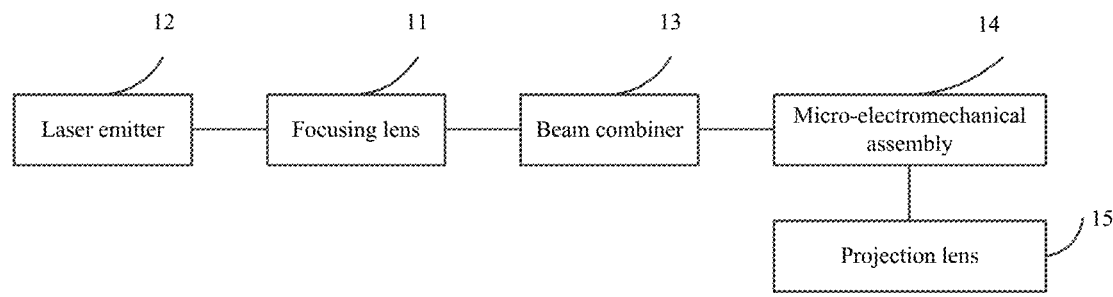
FIG. 1 is a schematic diagram illustrating the structure of a laser beam scanning display device provided by some embodiments of the present disclosure.

FIG. 1 is a schematic diagram illustrating the structure of a laser beam scanning display device provided by some embodiments of the present disclosure. As shown in FIG. 1, the laser beam scanning display device may comprise:

a focusing lens 11, a laser emitter 12 located at a focal point of the focusing lens, a beam combiner 13, a micro-electromechanical assembly 14 and a projection lens 15.

The laser emitter 12 may emit trichromatic laser signals, in some embodiments, the trichromatic laser signals may be at least a set of trichromatic laser signals, and each set of trichromatic laser signals comprises three laser signals of red, green and blue. In some embodiments, the laser emitter 12 may comprise N laser emitting tubes, each of the laser emitting tubes may directly emit a laser signal having a preset wavelength, and the preset wavelength of the laser signal corresponds to a certain one of the three colors of red, green and blue, wherein N is greater than or equal to 3. In some embodiments, the laser emitter 12 may comprise N laser emitting tubes and N frequency multiplying circuits connected respectively with the N laser emitting tubes. The N frequency multiplying circuits are respectively configured to change wavelengths of laser signals emitted by the laser emitting tubes into ½ wavelengths. The ½ wavelengths obtained through frequency multiplying may correspond to a certain one of the three colors of red, green and blue. In some embodiments, the laser signal emitted by each laser emitting tube in the above laser emitters 12 of different structures has a small signal power that is normally lower than 0.385 mw as specified by the laser safety standard. In some embodiments, the signal power of any one of the laser signals may typically be 0.27 mw, which is far lower than that as specified by the laser safety standard.

The above laser emitter 12 may be located at the focal point of the focusing lens 11, such that focusing effects may appear when the focusing lens 11 focuses the laser signals of the same color emitted by the laser emitter 12. In some embodiments, the focusing lens 11 may be a transmission-type lens, e.g., plano-convex lens, positive concavo-convex lens, aspheric lens or a reflection-type lens, e.g., reflecting lens.

In some embodiments, the beam combiner 13 may be comprised of a plurality of reflecting mirrors. With reference to the foregoing relevant description of the laser emitter 12, the number of reflecting mirrors in the laser emitter 12 may be N+1, and each laser signal of the trichromatic laser signals has a corresponding reflecting mirror. In some embodiments, when the laser emitter 12 comprises three laser emitting tubes, they are respectively used for emitting a red laser signal, a green laser signal and a blue laser signal. The reflecting mirrors corresponding to the red laser signal, the green laser signal and the blue laser signal may respectively be a reflecting mirror 1, a reflecting mirror 2 and a reflecting mirror 3. The three reflecting mirrors are respectively used for reflecting the red laser signal, the green laser signal and the blue laser signal. In some embodiments, the beam combiner 13 may further be arranged therein with a reflecting mirror 4. This reflecting mirror 4 can converge the laser signals reflected by the reflecting mirrors 1, 2 and 3. The trichromatic laser signals emitted by the laser emitter 12 are converged via the beam combiner 13 to form a convergent laser signal. The beam combiner 13 may reflect the convergent laser signal to the micro-electromechanical assembly 14 using the reflecting mirror 4 arranged therein. In some embodiments, the schematic diagram of a structure of the laser beam scanning display device provided by the embodiment of the present disclosure may be shown in FIG. 2.

In some embodiments, the beam combiner 13 may comprise a collimating mirror and a reflecting mirror. Here, the collimator may be used to converge the trichromatic laser signals emitted by the laser emitter 12 to form a convergent laser signal, and the beam combiner 13 may reflect the convergent laser signal to the micro-electromechanical assembly 14 using the reflecting mirror 4 arranged therein.

After receiving the convergent laser signal, the micro-electromechanical assembly 14 may reflect the convergent laser signal to the projection lens 15. As the micro-electromechanical assembly 14 is an assembly capable of adjusting its own angle according to preset manners, the positions of the convergent laser signal received thereon by the projection lens 15 will change along with variations in the angle of the micro-electromechanical assembly 14 itself. In other words, the micro-electromechanical assembly 14 may scan the convergent signal to generate a content to be displayed. In some embodiments, the scanning may be conducted in a progressive or interlaced manner.

In some embodiments, the laser beam scanning display device displays the content to be displayed, which is generated through scanning, on the screen using the projection lens 15. When this laser beam scanning display device is applied in a scene where it is required to be used cooperatively with AR apparatus, and the AR apparatus is a pair of AR glasses, the glass of the AR glasses may be the screen; when the AR apparatus is an AR helmet, the screen is the display screen arranged in the AR helmet.

In some embodiments, the laser beam scanning display device comprises a focusing lens, a laser emitter located at a focal point of the focusing lens, a beam combiner, a micro-electromechanical assembly and a projection lens. After the laser emitter in the laser beam scanning display device emits trichromatic laser signals, these trichromatic laser signals are irradiated into the beam combiner via the focusing lens; then, the beam combiner may converge the three trichromatic laser signals of red, green and blue into a convergent laser signal and reflect it to the micro-electromechanical assembly. The micro-electromechanical assembly performs scanning according to the received convergent laser signal to obtain a content to be displayed. The content to be displayed, which is generated after scanning, is displayed on the screen via the projection lens. In the above laser beam scanning display device, after the convergent signal is generated, the content to be displayed, which is obtained after the scanning by the micro-electromechanical assembly, can be displayed, via the projection lens, on the lenses of the AR glasses, and no laser signal reflecting or transmitting means is required to be arranged between the micro-electromechanical assembly and the projection lens. In some embodiments, the volume of the laser beam scanning display device is reduced, such that this laser beam scanning display device can be better applied to AR apparatus.

Figure 3:
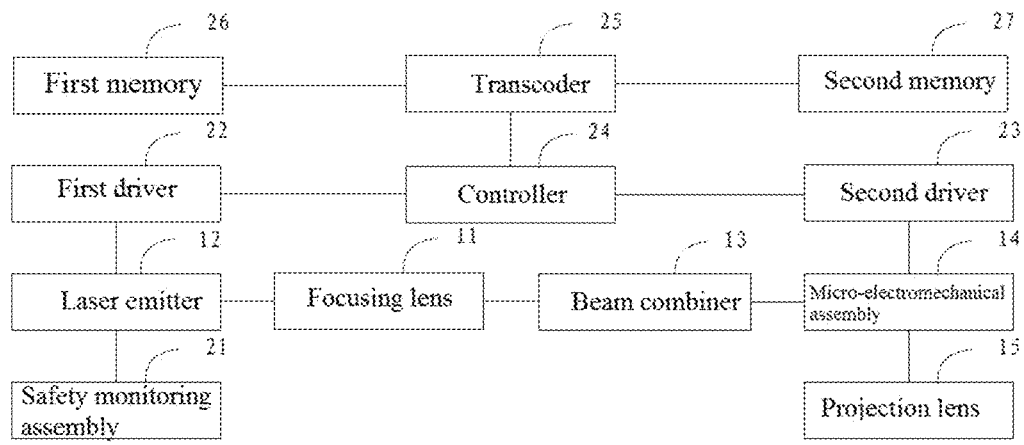
FIG. 3 is a schematic diagram illustrating the structure of the laser beam scanning display device provided by some embodiments of the present disclosure.

FIG. 3 is a schematic diagram illustrating the structure of the laser beam scanning display device provided by some embodiments of the present disclosure. As shown in FIG. 3, in addition to the embodiment as shown in FIG. 1, the laser beam scanning display device provided by this embodiment may further comprise a safety monitoring assembly 21 connected with the laser emitter 12.

The laser emitter 12 emits laser signals to the safety monitoring assembly 21. After receiving trichromatic laser signals, the safety monitoring assembly 21 acquires the signal power of each laser signal of the trichromatic laser signals and controls the operating state of the laser emitter 12 based on the level of the signal power.

In some embodiments, the laser beam scanning display device provided by the present disclosure may be used cooperatively with AR apparatus, the distance between the screen and human eyes may be short. The signal power of the laser signals may be monitored by the safety monitoring assembly 21, in order to reduce eye-injury caused by laser signals.

In some embodiments, the control rule for the control over the operating state of the laser emitter 12 is as follows: if the signal power of each laser signal of the trichromatic laser signals is less than or equal to a preset safety power, the laser emitter 12 is controlled to emit the trichromatic laser signals, such that the focusing lens 11 may receive these trichromatic laser signals; if the signal power of any laser signal of the trichromatic laser signals is greater than the preset safety power, and in this case, the eyes of a user may be damaged by viewing. At this time, the safety monitoring assembly 21 will control the laser emitter 12 to stop emitting the trichromatic laser signals.

In some embodiments, the laser beam scanning display device may further comprise a first driver 22 connected with the laser emitter 12. The first driver 22 is used for driving the laser emitter 12 after receiving a first driving signal. Then, the laser emitter 12 may emit trichromatic laser signals.

In some embodiments, the laser beam scanning display device may further comprise a second driver 23 connected with the micro-electromechanical assembly 14. The second driver 23 is used for driving the micro-electromechanical assembly 14 after receiving a second driving signal.

In some embodiments, after being driven by the first driver 22, the laser emitter 12 may start to emit trichromatic laser signals. In some embodiments, the laser emitter 12 controls its own laser emitting tube to intermittently emit light several times in a preset time period instead of emitting trichromatic laser signals continuously. Furthermore, the laser emitting tubes emitting laser in different colors in a preset time period may have different number of times for emitting light. In some embodiments the content to be displayed, which is generated by the micro-electromechanical assembly 14, may be construed as one or more frames of pictures, any pixel point in any frame of pictures has different RGB values. The numbers of times of emitting of the red laser signal, the green laser signal and the blue laser signal emitted by the laser emitter 12, within a preset time period, correspond respectively to R value, G value and B value of pixel points. For example, if the RGB values of a certain pixel point are respectively 242, 156 and 177, the numbers of times of glowing of the laser emitting tubes arranged in the laser emitter 12 for emitting laser signals of red, green and blue are respectively 242, 156 and 177 within a preset time period. In other words, after the beam combiner 13 converges the red, green, and blue laser signals, convergent laser signals of different colors may be obtained. The micro-electromechanical assembly 14 may obtain a content to be displayed by scanning the convergent laser signals of different colors.

As can be learned from the above description, both the first driver 22 and the second driver 23 are controlled by driving signals. In some embodiments, the laser beam scanning display device may further comprise a controller 24 connected respectively with the first driver 22 and the second driver 23. This controller 24 is used for generating a first driving signal and a second driving signal to respectively drive the first driver 22 and the second driver 23.

In some embodiments, a plurality types of contents to be displayed can be displayed by the laser beam scanning display device, such as pictures, videos, and the like.

In some embodiments, when the content to be displayed is of a video type, the laser beam scanning display device may further comprise a transcoder 25 connected with the controller 24.

The transcoder 25 is used for converting the data format of an original video content into that suitable for use in the laser beam scanning display device. In other words, it is used for generating a transcoded video content. In some embodiments, the first and second driving signals mentioned above may be generated by transcoding. In some embodiments, the controller 24 may, after the transcoder 25 finishes its transcoding, send the first driving signal and the second driving signal to the first driver 22 and the second driver 23, respectively. In other embodiments, the controller 24 may, after the transcoder 25 begins its transcoding, send the first driving signal and the second driving signal to the first driver 22 and the second driver 23, respectively.

In some embodiments, the laser beam scanning display device may provide a separate storage space to facilitate the management of the content displaying device on video contents. For example, the laser beam scanning display device may further comprise a first memory 26 connected with the transcoder 25 and a second memory 27 connected with the transcoder 25, The first memory 26 is used for storing a transcoded video content, and the second memory 27 is used for storing a pre-transcoding original video content.

In some embodiments, the micro-electromechanical assembly 14 may adjust its own angle according to preset manners. The micro-electromechanical assembly 14 is arranged therein with a reflecting mirror, and under normal circumstances, the angle of this reflecting mirror may be regarded as the angle of the micro-electromechanical assembly 14. In some embodiments, the controller 24 in the laser beam scanning display device is further used for adjusting the angle of the reflecting mirror arranged in the micro-electromechanical assembly 14 based on a preset adjustment angle contained in an angle adjustment instruction, such that the micro-electromechanical assembly 14 may, based on the preset adjustment angle, scan the convergent signal according to a preset shape and in a preset scanning manner. In some embodiments, the angle adjustment instruction may be sent to the micro-electromechanical assembly 14 at a preset time interval. The preset shape may be a conic shape, and the preset scanning manner may be the interlaced scanning. Scanning can be conducted outwards from the center point, images in the center point are clear, so as to satisfy the requirements of human eyes for visual focusing. Alternatively, it is certain that the preset scanning manner may also be the progressive scanning.

In some embodiments, it will readily be appreciated that there may be errors in any assemblies, including the micro-electromechanical assembly 14. The error of the micro-electromechanical assembly 14 may be construed as the error of the reflecting mirror arranged in the micro-electromechanical assembly 14 in some certain extent, i.e. that the actual adjustment angle of the reflecting mirror is inconsistent with the preset adjustment angle in the angle adjustment instruction. This would affect the display effects of the content to be displayed that is obtained after the scanning by the micro-electromechanical assembly 14. If the error is excessive, there may even exist the situation in which images to be displayed can't be viewed. In order to reduce the occurrence of the above problems, the controller 24 in the laser beam scanning display device is further used for: calculating an error angle between the actual adjustment angle of the reflecting mirror and the preset adjustment angle; and then, calibrating the adjustment angle of the reflecting mirror based on the preset adjustment angle and the error angle.

In some embodiments, every time when the angle of the reflecting mirror is subjected to adjustment, the controller 24 will acquire the current angle of the reflecting mirror after angle adjustment. In the case that the current angle of the reflecting mirror is angle 1, and after the controller 24 sends out the angle adjustment instruction, the angle of the reflecting mirror is further adjusted according to the preset adjustment angle contained in the angle adjustment instruction and on the basis of the angle 1 so as to obtain angle 2. The difference between the angle 2 and the angle 1 is the actual adjustment angle of the reflecting mirror. Then, the actual adjustment angle and the preset adjustment angle are utilized to calculate the error angle between them.

The controller 24 may send this error angle to the micro-electromechanical assembly 14 to be recorded by the micro-electromechanical assembly 14. After the controller 24 re-sends the angle adjustment instruction to the micro-electromechanical assembly 14, the angle of the reflecting mirror in the micro-electromechanical assembly 14 may be adjusted according to a preset adjustment instruction and the previously calculated error angle. In other words, the adjustment angle is calibrated.

In some embodiments, the laser beam scanning display device further comprises a safety monitoring assembly for judging whether or not the signal power of each laser signal emitted by the laser emitter is greater than a preset safety power, wherein, when the signal power of the laser signals is excessive, this safety monitoring assembly controls the laser emitter to stop emitting laser signals, thus reaching protective effects on eyes of a user. When the content to be displayed is of a video type, the laser beam scanning display device further comprises a first memory and a second memory that are separate from each other and used for storing video contents at different processing stages. As such, it is convenient for the laser beam scanning display device to manage video contents at different processing stages. The laser beam scanning display device may further comprise a controller used to calibrate the adjustment angle of the micro-electromechanical assembly to ensure that the micro-electromechanical assembly can generate a complete content to be displayed with good viewing effects.

Figure 4:
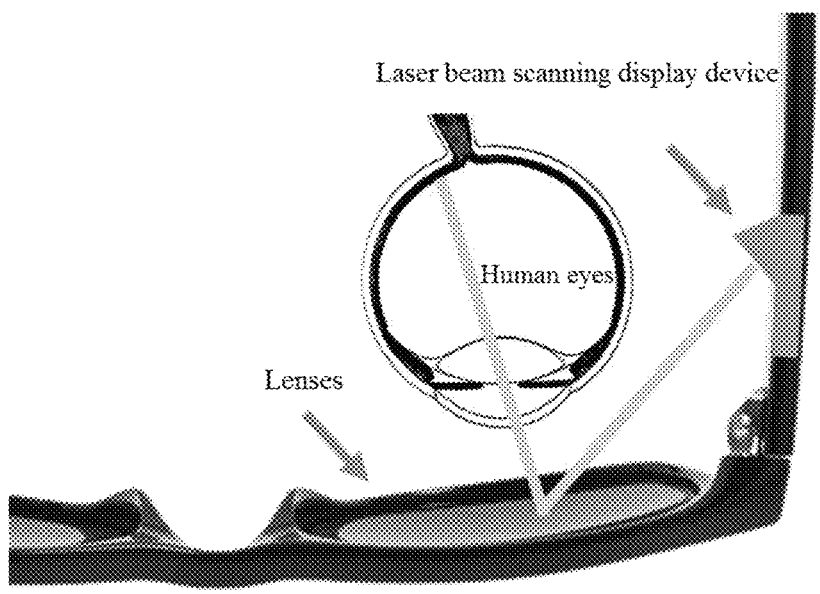
FIG. 4 is a schematic diagram illustrating the structure of AR glasses provided by some embodiments of the present disclosure.

FIG. 4 is a schematic diagram illustrating the structure of AR glasses provided by some embodiments of the present disclosure. As shown in FIG. 4, the AR glasses comprise lenses, a glasses holder for fixing the lenses and a laser beam scanning display device involved in some above embodiments, the laser beam scanning display device may be arranged on an outer side of the glasses holder, and the lenses constitute the screen.

In some embodiments, the relationship of positions between the laser beam scanning display device and the lenses of the AR glasses is shown in FIG. 4. The distance between the laser beam scanning display device and the lenses may also be changed based on different usage requirements.

Figure 2:
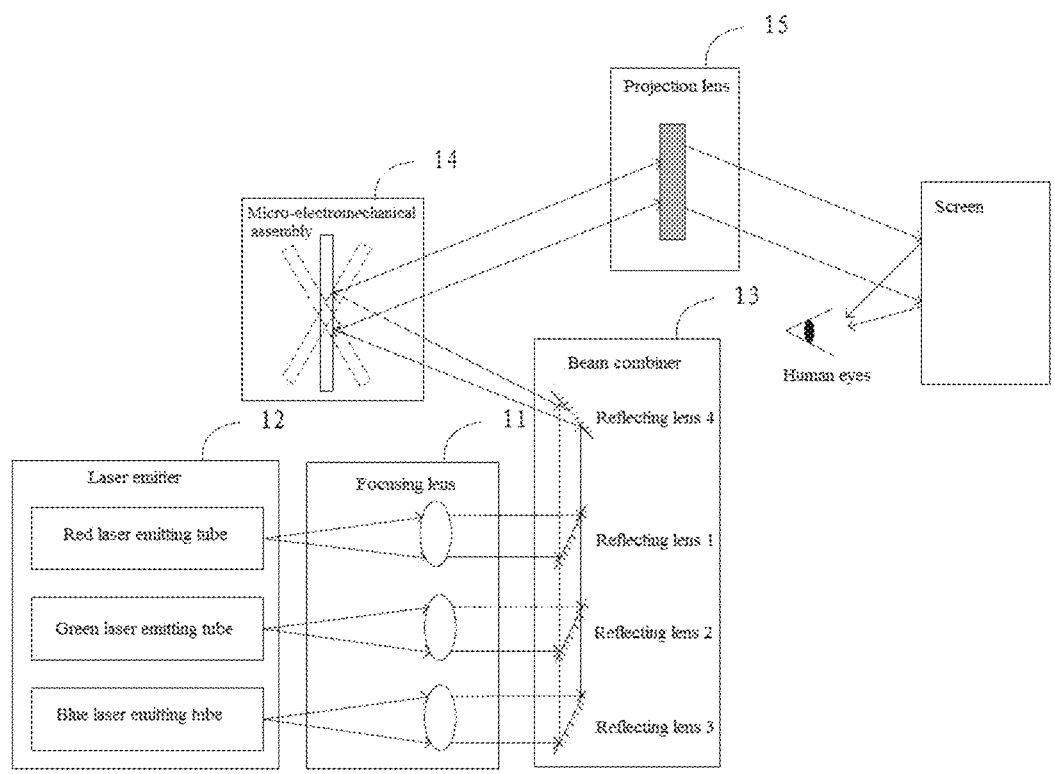
FIG. 2 is a schematic diagram illustrating an alternative internal structure of the laser beam scanning display device provided by some embodiments of the present disclosure.

As for the portions of the present embodiment that are not described, reference may be made to the relevant description of the embodiments as shown in FIGS. 1-3. For the execution process and technical effects of this technical solution, reference may be made to the description in the embodiments as shown in FIGS. 1 to 3.

The embodiments of means described above are merely schematic. Here, the units explained as separate components may or may not be physically separated; the components shown as units may or may not be physical units, i.e. that they may be located on one place or distributed on multiple network units. Some or all of the modules therein may be selected, based on actual requirements, to realize the object of the technical solution of the present embodiment. They can be appreciated and implemented by those of ordinary skill in the art without inventive efforts.

Through the description of the above implementations, it will be apparent to those skilled in the art that various implementations may be implemented by means of necessary general-purpose hardware platforms, which, without doubt, can also be implemented through the manner in which hardware is combined with software. Based on such understanding, the essence of the above technical solutions or portions thereof contributing to the prior art may be embodied in the form of a product. This computer product may be stored in a computer readable storage medium (e.g., ROM/RAM, magnetic disk, optical disk and the like), and comprises several instructions for enabling a computer device (which may be a personal computer, a server or a network means, etc.) to execute the methods described in various embodiment or some portions of the embodiments.

Finally, it should be noted that the above embodiments are used merely to explain the technical solutions of the present disclosure, instead of as limitations thereon; although the present disclosure has been described in detail with reference to the foregoing embodiments, those of ordinary skill in the art should appreciate that modifications can still be made to the technical solution as set forth in each of the foregoing embodiments or some of the technical features in the technical solutions may be equally substituted; and these modifications or substitutions do not lead to the departure of the nature of a corresponding technical solution from the spirit and scope of the technical solutions as set forth in various embodiments of the present disclosure.

The invention claimed is:

1. A laser beam scanning display device, comprising:
a focusing lens, a beam combiner, and a projection lens;
a laser emitter, located at a focal point of the focusing lens, being configured to emit trichromatic laser signals;
a micro-electromechanical assembly; and
a first driver, connected with the laser emitter; wherein, the beam combiner is configured to converge the trichromatic laser signals irradiated via the focusing lens into one convergent laser signal and reflect the convergent laser signal to the micro-electromechanical assembly; the micro-electromechanical assembly is configured to scan the received convergent laser signal to generate a content to be displayed, and the projection lens is configured to receive the content to be displayed from the micro-electromechanical assembly directly and display the content to be displayed on lenses of augmented reality glasses directly; wherein, the content to be displayed is one or more frames of pictures to be viewed by an user; and
the first driver is configured to drive the laser emitter to determine a number of times of glowing within a preset time period based on color values of various pixel points in the content to be displayed in three color channels corresponding respectively to three primary colors.

2. The device of claim 1, further comprising:
a safety monitoring assembly connected with the laser emitter and configured to control an operating state of the laser emitter based on a signal power of each laser signal of the obtained trichromatic laser signals.

3. The device of claim 2, wherein the safety monitoring assembly is further configured to:
control the laser emitter to emit the trichromatic laser signals if the signal power of each laser signal of the trichromatic laser signals is less than or equal to a preset safety power; and
control the laser emitter to stop emitting the trichromatic laser signals if the signal power of any laser signal of the trichromatic laser signals is greater than the preset safety power.

4. The device of claim 2, further comprising:
a first driver connected with the laser emitter and configured to drive the laser emitter to determine a number of times of glowing within a preset time period based on color values of various pixel points in the content to be displayed in three color channels corresponding respectively to three primary colors; and
a second driver connected with the micro-electromechanical assembly and configured to drive the micro-electromechanical assembly according to the received convergent laser signal.

5. Augmented reality glasses, comprising:
lenses;
a glasses holder for holding the lenses; and
a laser beam scanning display device according to claim 2, wherein:
the laser beam scanning display device is arranged on an outer side of the glasses holder; and
the lenses constitute the screen.

6. The device of claim 3, further comprising:
a first driver connected with the laser emitter and configured to drive the laser emitter to determine a number of times of glowing within a preset time period based on color values of various pixel points in the content to be displayed in three color channels corresponding respectively to three primary colors; and
a second driver connected with the micro-electromechanical assembly and configured to drive the micro-electromechanical assembly according to the received convergent laser signal.

7. Augmented reality glasses, comprising:
lenses;
a glasses holder for holding the lenses; and
a laser beam scanning display device according to claim 3, wherein:
the laser beam scanning display device is arranged on an outer side of the glasses holder; and
the lenses constitute the screen.

8. The device of claim 1, further comprising:
a second driver connected with the micro-electromechanical assembly and configured to drive the micro-electromechanical assembly according to the received convergent laser signal.

9. The device of claim 8, further comprising:
a controller connected with the first driver and the second driver respectively and configured to generate a first driving signal and a second driving signal to respectively drive the first driver and the second driver.

10. The device of claim 9, wherein:
the content to be displayed is of a video type, and
the device further comprises a transcoder connected with the controller and configured to transcode an original video content to generate a transcoded video content corresponding to the content to be displayed.

11. The device of claim 10, further comprising:
a first memory connected with the transcoder and configured to store the transcoded video content; and
a second memory connected with the transcoder and configured to store the original video content.

12. The device of claim 9, wherein:
the controller is further configured to send an angle adjustment instruction to the micro-electromechanical assembly, and
the micro-electromechanical assembly is configured to adjust an angle of a reflecting mirror arranged therein based on a preset adjustment angle contained in the angle adjustment instruction, so that the micro-electromechanical assembly scans the convergent signal according to a preset shape and in a preset scanning manner.

13. The device of claim 12, wherein the controller is further configured to:
calculate an error angle between an actual adjustment angle of the reflecting mirror and the preset adjustment angle;
calibrate an adjustment angle of the reflecting mirror based on the preset adjustment angle and the error angle.

14. The device of claim 10, wherein:
the controller is further configured to send an angle adjustment instruction to the micro-electromechanical assembly; and
the micro-electromechanical assembly is configured to adjust an angle of a reflecting mirror arranged therein based on a preset adjustment angle contained in the angle adjustment instruction, so that the micro-electromechanical assembly scans the convergent signal according to a preset shape and in a preset scanning manner.

15. The device of claim 11, wherein:
the controller is further configured to send an angle adjustment instruction to the micro-electromechanical assembly; and
the micro-electromechanical assembly is configured to adjust an angle of a reflecting mirror arranged therein based on a preset adjustment angle contained in the angle adjustment instruction, so that the micro-electromechanical assembly scans the convergent signal according to a preset shape and in a preset scanning manner.

16. Augmented reality glasses, comprising:
lenses,
a glasses holder for holding the lenses, and
a laser beam scanning display device according to claim 1, wherein:
the laser beam scanning display device is arranged on an outer side of the glasses holder; and
the lenses constitute the screen.

17. The device of claim 1, wherein the laser emitter comprises N laser emitting tubes and N frequency multiplying circuits connected respectively with the N laser emitting tubes.

18. The device of claim 17, wherein a signal power of a laser signal emitted by each laser emitting tube in the laser emitter is lower than 0.385 mw.

19. The device of claim 18, wherein the signal power of the laser signal is 0.27 mw.

20. The device of claim 1, wherein the focusing lens is a transmission-type lens or a reflection-type lens;
wherein the transmission-type lens comprises a plano-convex lens, a positive concavo-convex lens, and aspheric lens, and the reflection-type lens comprises a reflecting lens.

* * * * *